United States Patent [19]

Sanner et al.

[11] Patent Number: 5,023,923
[45] Date of Patent: Jun. 11, 1991

[54] PROGRAMMABLE SENSOR APERTURE

[75] Inventors: M. Duane Sanner, Irving, Tex.; Leonard J. Nunley, Farmington Hills, Mich.; Barry M. Wallace, Garland, Tex.

[73] Assignee: Light Signatures, Inc., Los Angeles, Calif.

[21] Appl. No.: 13,485

[22] Filed: Feb. 11, 1987

[51] Int. Cl.$^5$ .............................................. G06K 9/20
[52] U.S. Cl. ..................................... 382/61; 235/474; 382/63
[58] Field of Search ................... 382/7, 11, 24, 29, 61, 382/63, 67; 235/472, 474

[56] References Cited

U.S. PATENT DOCUMENTS

| | | | |
|---|---|---|---|
| 3,432,673 | 3/1969 | Mader | 382/67 |
| 3,443,027 | 5/1969 | Dohler | 382/66 |
| 3,502,850 | 3/1970 | Linquist | 235/474 |
| 3,553,646 | 1/1971 | Hardin et al. | 382/61 |
| 3,588,457 | 6/1971 | Dijleveld et al. | 382/11 |
| 3,593,287 | 7/1971 | Kobayashi et al. | 382/24 |
| 3,643,069 | 2/1972 | Kikuchi | 382/61 |
| 3,710,319 | 1/1973 | Miller et al. | 382/24 |
| 3,833,882 | 9/1974 | Busby | 382/24 |
| 4,179,685 | 12/1979 | O'Maley | 382/7 |
| 4,356,473 | 10/1982 | Freudenthal et al. | 382/63 |
| 4,424,587 | 1/1984 | Wevelspiep et al. | 382/61 |
| 4,464,786 | 8/1984 | Nishito et al. | 382/7 |
| 4,582,986 | 4/1986 | Stockburger et al. | 235/472 |
| 4,589,144 | 5/1986 | Namba | 382/61 |
| 4,592,090 | 5/1986 | Curl et al. | 382/7 |
| 4,613,987 | 9/1986 | Keverian | 382/66 |

FOREIGN PATENT DOCUMENTS

| | | | |
|---|---|---|---|
| 55-121385 | 9/1980 | Japan | 382/61 |
| 55-154871 | 2/1990 | Japan | 382/61 |

Primary Examiner—Michael Razavi
Assistant Examiner—J. Mancuso
Attorney, Agent, or Firm—Nilsson, Robbins, Dalgarn, Berliner, Carson & Wurst

[57] ABSTRACT

A document to be verified or tested as a possible counterfeit is scanned by a system that optically senses a specific target area or aperture on the document. This area may include material deposited on the document or may be simply the document material. A reference grid is imprinted on the document to locate the same target area to be sensed each time the document is scanned, independent of the transport used to do the scanning. The reference grid is used to locate the target area both vertically and horizontally and signals sensed from the target area are combined to a representative composite.

6 Claims, 4 Drawing Sheets

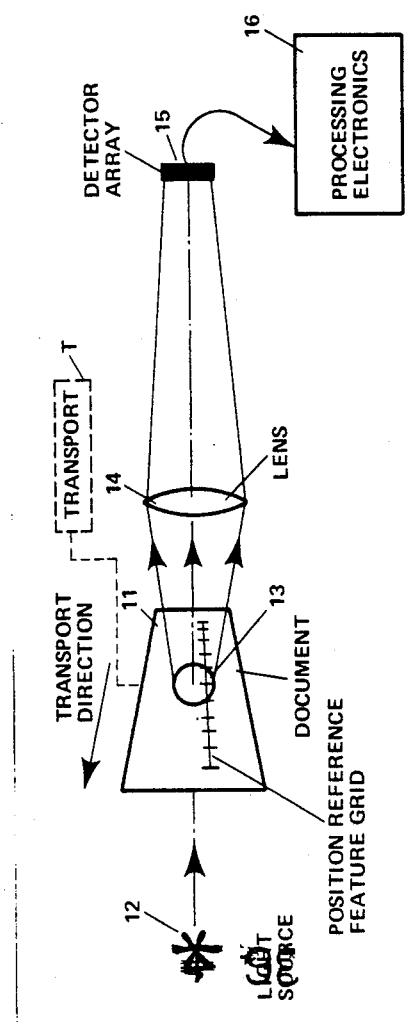
*Figure 1*
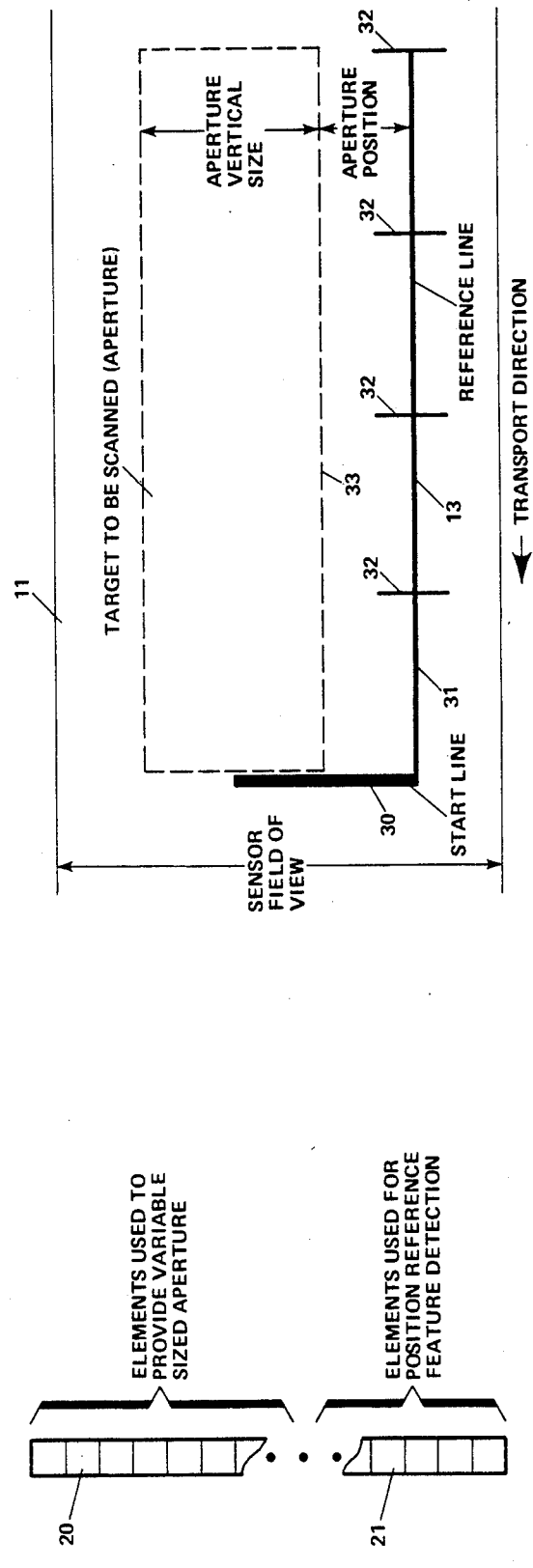
*Figure 3*
*Figure 2*

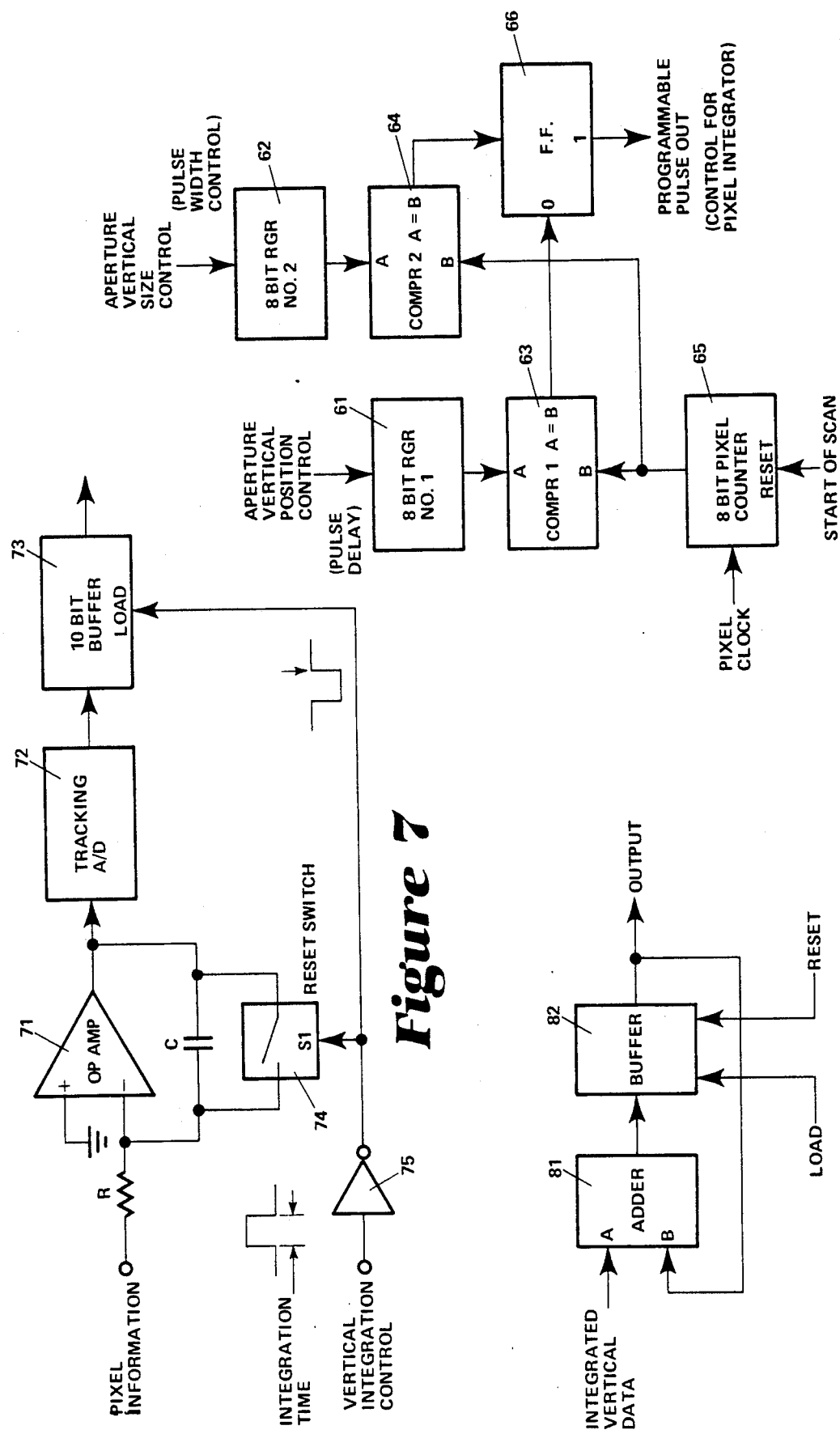

PROGRAMMABLE SENSOR APERTURE

This is a continuation of application Ser. No. 744,823, filed June 14, 1985, which is a continuation of application Ser. No. 436,113, filed Oct. 22, 1982, now abandoned.

This invention relates to document authentication and counterfeit detection systems and more particularly to a system for repeatedly scanning the same target aperture or area on a document for identification purposes.

BACKGROUND OF THE INVENTION

In the authentication of documents and the detection of counterfeits various methods and structures have been used. For example, prior systems may operate by scanning banknotes to detect counterfeits. Banknotes have been sensed to identify specific patterns in the engraving, both by reflective sensing and by directing a light to pass through the banknote. The scanning is usually along the length of the banknote. For example, U.S. Pat. No. 4,041,456 discloses a system in which a banknote is scanned to provide information that is compared with stored information relating to the particular banknote being scanned. While useful, such techniques are not effective to distinguish a specific document from all others. Also, in using many prior systems, the printed information on a document is not sufficient to authenticate a document. Other patents disclosing sensing systems relative to the present invention, e.g. columnar detectors or arrays to produce a form of video signal include U.S. Pat. Nos. 3,432,673 (Mader); 3,593,287 (Kobayashi et al.) and 3,710,319 (Miller et al.)

SUMMARY OF THE INVENTION

The present invention provides an efficient and practical system for consistently sensing a precise area on a document (herein called an aperture) to sense characteristics of the document. The characteristics may, for example, result either from deposits on the document in the form of imprinted material or from the fiber patterns of the document material, or combinations thereof. In any case, for reliable authentication, it is important to consistently scan the same aperture on a document, even when using different scanning transports.

In accordance herewith, the problem of target location can be solved by using an edge of the document or a reference grid pattern to provide aperture-location information. Variations in document vertical displacement and skew can be overcome by dynamically monitoring the document and reference position. As exemplary structures, either a columnar or a two-dimensional sensor array could be used to dissect an image of light that is transmitted through, or reflected by, the document to provide a video signal.

As disclosed herein, part of the sensor array is used to detect a reference grid pattern, or positional reference feature. By monitoring the output of select elements of the sensor array, the positional reference feature of the document is sensed and the position of the aperture is defined. Electronically gating and integrating the outputs from the array elements produces a variable aperture of programmable size and shape. Aperture size control is accomplished by processing the video signals from vertical scansions (scan lines) sensed by a columnar or multiple columns of a two-dimensional detector array.

BRIEF DESCRIPTION OF THE DRAWINGS

The technical advance represented by the invention is best understood from the following description and the drawings in which:

FIG. 1 is a diagrammatic illustration of a system of the present invention;

FIG. 2 is a diagrammatic illustration of a single column of array elements in which the elements have been divided into two groups, one to locate the area to be scanned, another to provide a variable-size aperture;

FIG. 3 is a plan view of a fragment of a document illustrating both a position reference grid and an aperture of variable size and location on a document;

FIG. 6 is a block diagram illustrating an example of a programmable pulse generator as used in the system of FIG. 4;

FIG. 7 is a block diagram illustrating the vertical pixel integrator as used in the system of FIG. 4; and FIG. 8 is a block diagram illustrating the horizontal pixel integrator as used in the system of FIG. 4.

DETAILED DESCRIPTION OF THE PREFERRED EMBODIMENT

Figure 4:
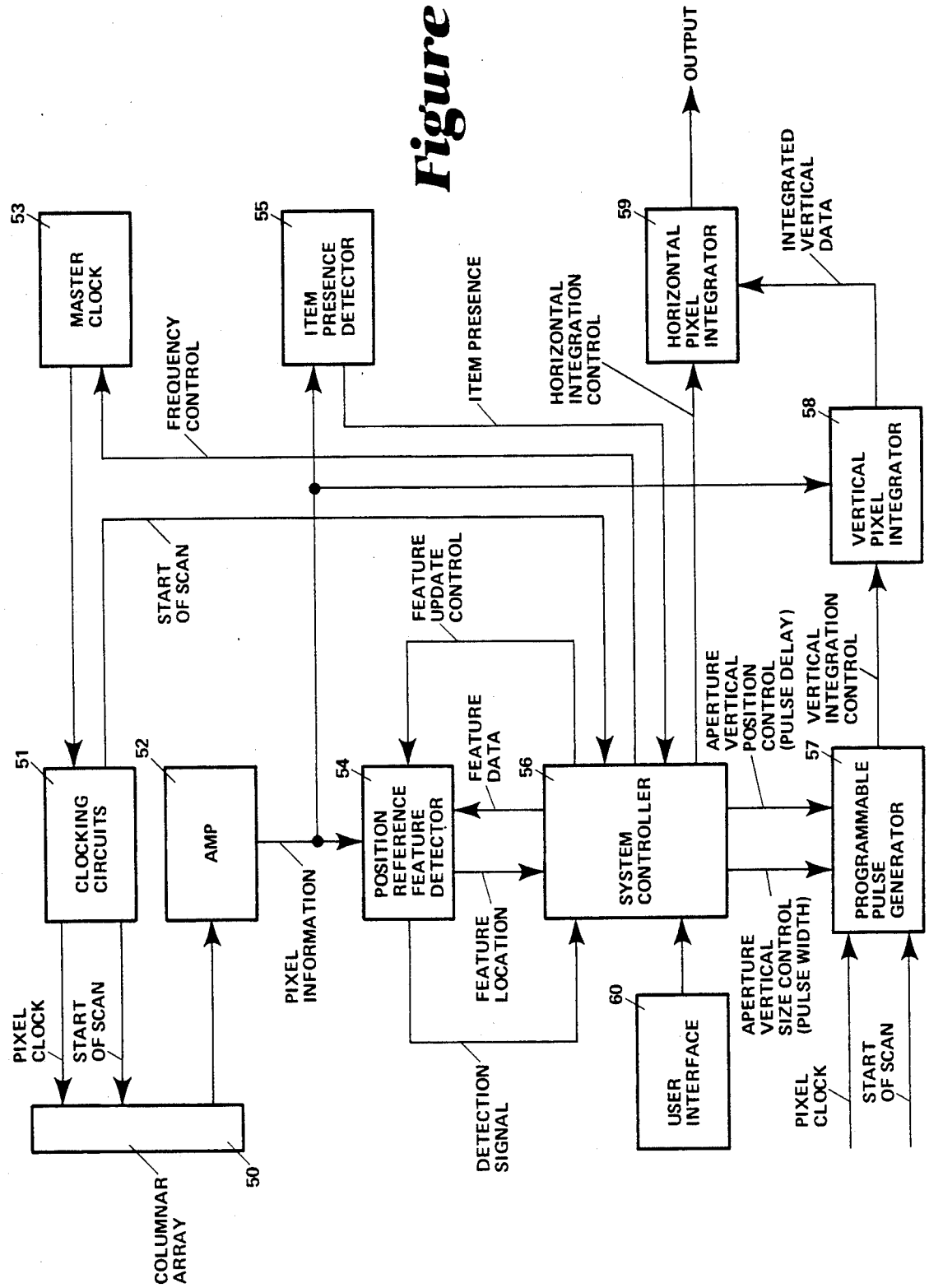
FIG. 4 is a block diagram of the system of the invention.

Referring initially to FIG. 1, a system is diagrammatically represented for operation with a document 11 illuminated by light source 12. The light source 12 illuminates the rear of the document 11 to provide a translucent image of the fiber material of the document. The document 11 is moved by a transport T so that the document is scanned as it passes the array 15.

The total area to be scanned on the document 11 includes a mark (in the form of a position reference grid 13) and the aperture portion of the document which is to be used for authentication i.e the target area to be scanned as indicated in FIG. 3. A portion of the total area to be scanned is projected through a lens 14 to a self-scanning detector array 15. The resulting video signals from the array 15 are then processed by processing electronics 16, discussed in detail below with reference to FIG. 4.

FIG. 2 illustrates the imaging of the projected document information as it impinges on the surface of a columnar array. Each of the individual rectangular areas in the column of FIG. 2 represents a single photosensitive area on the array. The areas each produce a single picture element (pixel) which are sequenced to provide a video signal from the array. The array 15 may be a two-dimensional or an area array, in which case the array would be an N × M array where N and M are any desired number or numbers suitable for sensing the desired portion of the document.

It should be noted that the array 15 (FIG. 1) senses a narrow elongate light pattern from the document. The total area to be scanned on the document is sensed by scanning the document in the horizontal direction (see FIG. 1) and repeatedly sequencing through the array, vertically from the bottom to the top. Thus, the area to be scanned is dissected in a vertical raster pattern to provide a video signal.

As the document scanning occurs, the radiant energy impinging on the columnar array (FIG. 2) is divided into two vertical portions to be sensed by the regions 20 and 21. The absolute position of these regions is determined by the location of the document in front of the imaging lens and as a result may vary from scan to scan. Region 20 constitutes those elements of the array which sense the aperture (FIG. 3) of the document, i.e. the area that is to be used to authenticate the document. Region 21 (FIG. 2) constitutes those elements of the array to sense the position feature reference grid 13 (FIG. 3) to control the system to consistently sense the aperture in the same location.

The position reference grid 13 illustrated in FIG. 3 is used to locate the aperture 33 for authentication of the document. As a moving document carries the position reference grid 13 into the field of view of the detector array 15 (FIG. 1), the start line 30 (FIG. 3) is first sensed by the array 15. The purpose of the start line 30 is to present a detector in the processing electronics 16 (see FIG. 1) with an identifiable feature signifying that a reference line 31 (FIG. 3) immediately follows and that it lies within the confines of the vertical extent of the start line 30. The reference line 31 of the grid 13 is used as a reference for determining the vertical position of the aperture 33 during scanning. The reference line 31 of the grid 13 coincides to the length of the aperture 33 for continual updating of the aperture position. Tic marks 32 of the grid 13 are used for control of the transport T, velocity verification, sampling control, or further reference grid identification.

A block diagram of the output from the detector array 15 (FIG. 1) and processing electronics 16 is illustrated in FIG. 4. Considering that figure, a signal carrying video pixel information is provided from the self-scanning columnar array 50 as an output from the detector array 15. The signal is amplified by an amplifier 52, then sent to a position reference feature detector 54 and via a system controller 56 and a programmable pulse generator 57 to two pixel integrators 58 and 59. Those integrators provide digital signals representative of the sensed aperture.

For the system to locate the aperture 33 (FIG. 3), the user of the system provides signalrepresented instructions or operation parameters to the system controller 56 through a user interface 60. The instruction signals specify the type of reference features that are to be recognized and tracked, the position of the aperture 33 relative to the reference grid 13, aperture dimensions, and so on. Essentially, the position reference feature detector 54 is programmed to sense a specific video signal sequence that will be formed when a predetermined form of reference feature appears on a document.

The system controller 56, which may be a computer (dedicated microprocessor or logic controller) also sets a master clock 53 (upper right) to control the clock signal frequency for driving the array 50 and sequencing the elements to provide a continuous video signal. The scanning frequency is variable to allow compensation for velocity changes in the transport T (FIG. 1) which moves the document relative to the detector array 15. The clocking circuits 51 (FIG. 4, top center) divide the signal from the master clock 53 into various phases to provide a pixel clock signal required for the self-scanning operation of the array 50 to output pixel information in a serial sequence. Accordingly, the optical image from the document 11 is dissected and the array 50 provides a clocked video signal of vertical raster-scan pixels.

Also included in the circuits 51 is a counter that is clocked by the pixel clock signals, which produces a start of scan pulse (one pixel duration) after each counting to the total number of elements in the array. The start of scan pulse resets the columnar array 50 to jump back to the first element (new scan) and also is supplied to the system controller 56 for synchronization.

An item presence detector 55 (FIG. 4, right central) receives a signal from the amplifier 52 to sense the presence of a document 11 and actuate the array 50. When a document 11 is detected, the system controller 56 also is actuated.

The item presence detector 55, in one embodiment, consists of an integrator circuit and a fixed reference comparator. The integrator circuit is in the form of a low pass filter that serves to combine the signal pixel outputs from each scan of array 50 to simulate a single output signal as would be obtained from a single photosensor with a tall and narrow geometry. The integrated, filtered, or composite signal from the filter will have a much lower value when a document is positioned to interrupt the light source 12 (FIG. 1) than when the light source is viewed directly by the array detector 15. The composite signal drives one input of a comparator circuit (in the detector 55, FIG. 4) whose second input is adjusted to a reference voltage level. As a document covers the light source, the composite signal will drop below the reference voltage producing a logic level output from the detector 55 to indicate the presence of a document.

The position reference feature detector 54 (FIG. 4, center) in one embodiment, contains pattern recognition circuits that analyze the video signal from the amplifier 54 (representing a pixel data stream) to identify characteristics or features that indicate the reference grid 13 (FIG. 1) is being scanned. Examples of features would be tall black lines or short black lines. Such features can be detected by circuits that recognize a continuous stream of black pixels of predetermined length in the video signal. Initially, the position reference feature detector 54 searches the video signal for the reference feature grid 13 required by the system controller 56 for tracking.

The reference feature detector 54 provides the video signal to the system controller 56 indicating the pixel locations in which the position feature resides. For example, considering the reference feature grid 13 shown in FIG. 3, the system controller 56 must be actuated on sensing the start line 30 (FIG. 3). Hence, the reference feature detector 54 (FIG. 4) searches for the start line 30 (FIG. 3). Once the start line 30 is sensed, the system controller 56 conditions the reference feature detector 54 to search repeatedly for the reference line 31.

Figure 5:
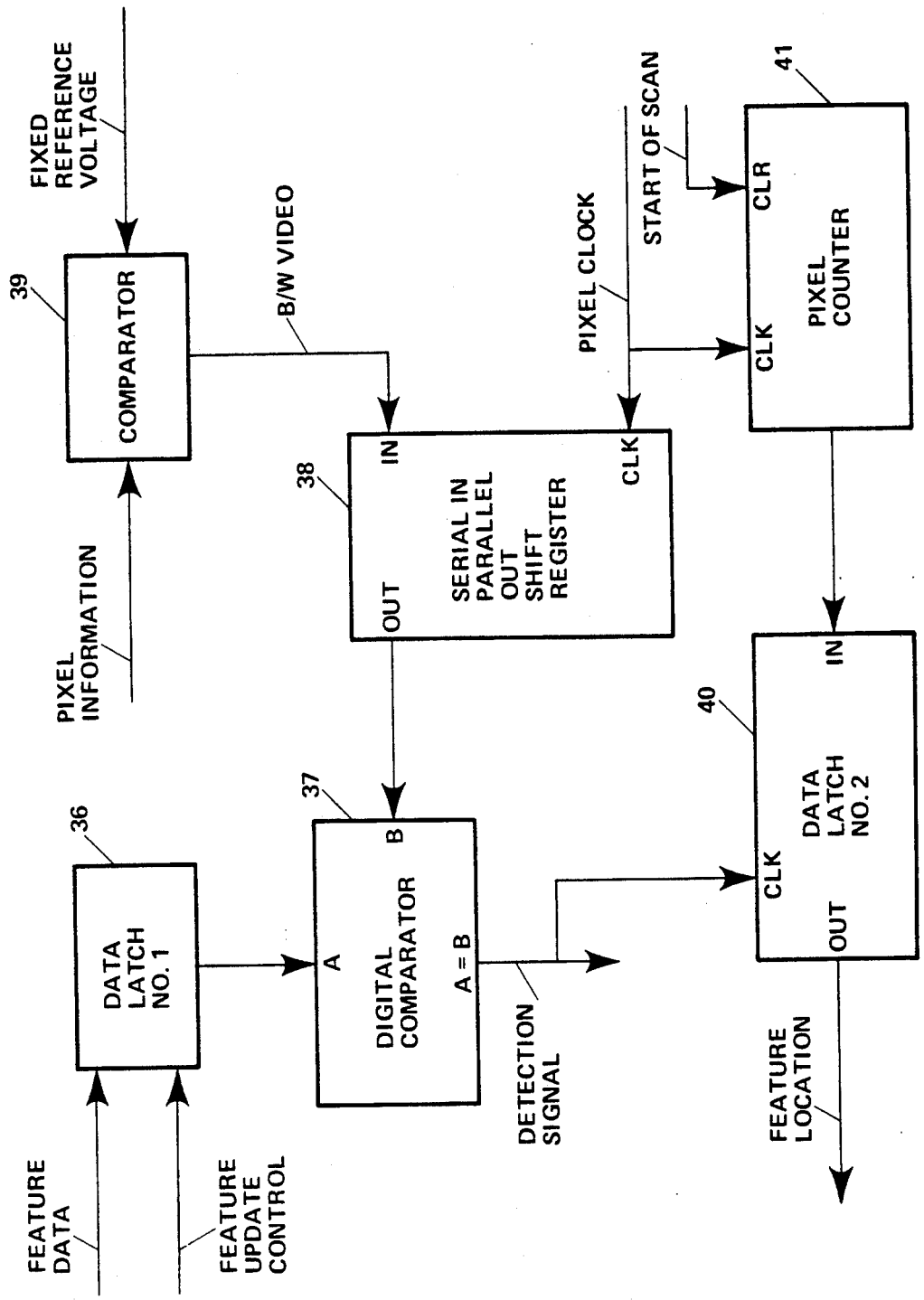
FIG. 5 is a block diagram illustrating an example of a reference feature detector as used in the system of FIG. 4.

An exemplary position reference detector 54 is illustrated in FIG. 5. Operation is briefly as follows. Feature data from the system controller 56 is loaded into data latch 1, a register 36, when the feature update control signal is received. The latched data is then compared by a digital comparator 37 to the video signal presented from a serial in-parallel out shift register 38. The register 38 also receives a signal in the form of select video or B/W video which is generated by thresholding the pixel information with a fixed reference voltage in a comparator 39.

When both inputs to the digital comparator 37 are equal, a detection signal is sent to the system controller 56 (FIG. 4) and to a second data latch 40 (FIG. 5) which is driven by a counter 41 so as to register the pixel location where the feature was detected.

A programmable pulse generator 57 (FIG. 4, lower left) provides a real time signal (pulse) for control of the vertical pixel integrator 59. The start of the pulse relative to the beginning of a line scan cycle of the scanned array determines the bottom position of the aperture 33 (FIG. 3) (vertically). The width of the pulse determines the number of pixels that will be included in the integration, i.e. vertical height of the aperture 33.

A digital form of the programmable pulse generator 57 is illustrated in FIG. 6. The circuit includes two eight-bit registers 61 and 62. The output of register 61 goes to a comparator 63 and the output of register 62 goes to a comparator 64. Both comparators 63 and 64 receive the pixel count from an eight-bit pixel counter 65. The results of the comparison of each comparator is input to flip flop 66.

Operation of FIG. 6 is briefly as follows. Pixel counts, from the system controller 56, that define the start and stop points of the output pulses are loaded into buffer registers 61 and 62. Buffer registers 61 and 62 each supply one set of inputs to the eight-bit logic comparators (63 and 64). The other input for each comparator is from pixel counter 65 that is reset at the start of each line scan. When the pixel count reaches the value set in register 61, comparator 63 will produce an output that sets the output flip flop 66 to "1". This establishes the leading edge of the output pulse. In a similar sequence of operation the pulse width or trailing edge is determined by the count stored in register 62.

A detailed form of the vertical pixel integrator 58 is illustrated in FIG. 7. The vertical integrator 58 combines the data from a continuous string of pixels through use of an analog integrator circuit. This can be viewed as a summation of the analog signals. The start and length of the integration period is controlled by the pulse signal from the programmable pulse generator 57. The amplitude of the integrator output at the end of the integration window is sampled and retained for additional processing.

One implementation of the circuit, as illustrated in FIG. 7, is a conventional operation amplifier 71, with a reset switch 74 followed by a tracking analog to digital converter 72, with an output buffer 73 as the hold circuit. Integration control is supplied through inverter 75.

The vertical pixel integrator 58 operates as follows. When the integration control signal is low, the integration reset switch 74 will be "on", holding the integrator in a reset condition. The output will be near zero. During the integration time (control high) switch 74 is open allowing the amplifier 71 to function as an integrator with the pixel signal as an input. The tracking converter 72 will follow the integrated value. At the end of the integration time, the output buffer will be loaded with the signal results from the A/P converter 72 and the switch 74 will be closed to reset the integrator. The results of the pixel integration will be held as a ten-bit digital value until the completion of the next integration time, at which time it will be updated with new results.

The function of the horizontal pixel integrator 59 (FIG. 4) is to combine a number of vertical scans to form the complete length of the aperture 33. The width or horizontal size of the aperture 33 is controlled by the horizontal pixel integrator 59 and the height or vertical size is controlled or formed by the vertical pixel integrator 58. Since the output of the vertical pixel integrator 58 is in a digital word form, the integration or combining is done by adding together the outputs from as many scans as desired. This can be represented by an adder 81 and a buffer 82 that are reset after every "N" scans. The representation is illustrated in FIG. 8.

Based on the position (vertical pixel count and possible horizontal scan count) the system controller sends out signals controlling the integration of the pixel amplitude information on a scan-by-scan basis. The integration window dimensions (vertical and horizontal) are based on information supplied to the system controller by the user.

Considering the overall operation of the system of FIG. 4, an operator actuates the user interface 60 to program the system controller 56. Specific instructions include: the pattern of the grid 13 (FIG. 1), the vertical displacement of the aperture 33 (FIG. 3) from the reference line 31, i.e. the aperture position; and the height of the aperture 33.

With the system prepared, a document 11 (FIG. 1) is received by the transport T for movement across the detector array 15 to accomplish scanning of the document 11 within the sensor field of view (see FIG. 3). It is to be understood that the sensor field of view on the document 11 is scanned pixel-by-pixel in a raster pattern of vertical lines (bottom to top) progressing from left to right. It is to be understood that in the course of scanning the document 11, the detector elements 21 (FIG. 2) sense the grid 13 and thereby define the target area or aperture 33 which is sensed by the detector elements 20. Thus, the aperture 33 can be accurately and consistently sensed for testing the document 11.

To consider an exemplary operation in detail, the presence of a document in the sensor field of view is sensed by the item presence detector 55. Such presence obscures the direct illumination of the array 15 which is manifest as a level shift in the video signal from the amplifier 52.

As the scanning operation progresses, the start line 30 is detected as a continuous series of black-indicating pixels manifest in the observed video signal from the columnar array 50 (FIG. 4). Essentially, the position reference detector 54 (FIG. 4) manifests the start line 30 (FIG. 3) as a detected signal on the occurrence of a video signal pattern defined as feature data from the system controller 56.

The presence of the start line (manifest in the video signal from the amplifier 52) defines the leading edge of the aperture 33 (FIG. 3). Subsequent operation of the system involves sensing the reference line 31 to locate the vertical displacement of the aperture 33 from that line. Specifically, during each vertical scansion, the reference line 31 is manifest as a black-indicating spike or pixel in the video signal. Such occurrences are sensed by the detector 54 (FIG. 4) to actuate the controller 56 which responds with a pair of control signals. Specifically, an aperture vertical position control (pulse delay) signal manifests the vertical displacement of the aperture 33 (FIG. 3) from the line 31. An aperture vertical size control (pulse width) signal manifests the height of the aperture 33.

Both signals are applied to the pulse generator 57 to accomplish a vertical integration control signal. That signal is applied to the integrator 58 to gate and integrate sequences of the video signal representative of vertical scansions to form composite digital representations. The series of such digital representations is summarized by the integrator 59 which provides a digital output that is representative of the composite translucency pattern of the aperture 33.

It is to be understood from the above description that the aperture size is variable and is determined by the user of the system. The position reference feature grid is used to inform the system where the target area is located on the document thereby allowing the system to read any desired size target area on any document when scanned on different scanning systems.

Although specific embodiments have been given for the various parts of the system, changes and modification will be apparent to those skilled in the art, which changes and modifications are deemed to fall within the scope of the invention as defined by the appended claims.

What is claimed is:

1. A system for characterizing a select target area of variable size and location on a document, said select target area being programmable in size and location with respect to a position reference in a larger area on said document, said larger area also encompassing any select target area, said system comprising:

a sensor array means for scanning said larger area of said document to provide pixel signals representative of said larger area encompassing said select target area and said position reference;

position reference detector means connected to receive said pixel signals for providing position reference signals manifesting the location of said position reference with respect to said pixel signals representative of said larger area;

program means for providing select target area signals to indicate the defined size and location of said select target area with reference to said position reference of said document; and integrator means connected to receive said pixel signal representative of said larger area, said position reference signals and said select target area signals, said integrator means being controlled by said select target area signals and said position reference signals to selectively process those pixel signals that lie within said select target area to provide output signals representative solely of the characteristic of said select target area to identify said document.

2. A system according to claim 1 wherein said sensor array means comprises a columnar array of light-sensitive elements.

3. A system according to claim 2 wherein said sensor array means further includes clock means for sequencing said columnar array to provide said pixel signals.

4. A system according to claim 1 wherein said program means comprises a pulse means for producing a variable control pulse, the time of which indicates the position of said select area with reference to said position reference and the duration of which indicates the dimension of said select area with reference to said position reference.

5. A system according to claim 1 wherein said integrator means comprises means for converting said pixel signals to digital representations.

6. A system according to claim 5 wherein said integrator further includes means for accumulating said digital representations to provide said output.

* * * * *